Dec. 4, 1923.                                    1,476,591
               A. CASTIGLIONI
    DIFFERENTIAL GEAR FOR GONIOMETRIC APPARATUS
                Filed May 10, 1919
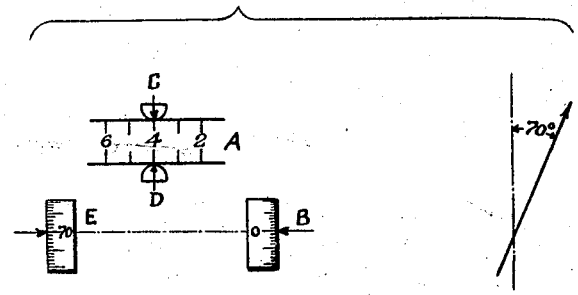
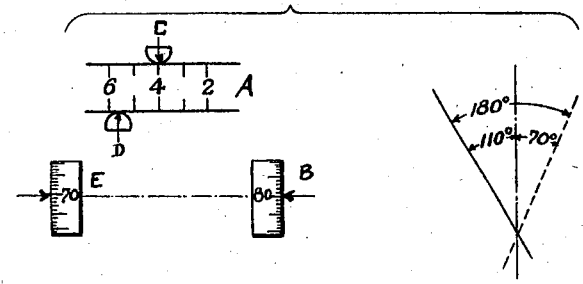
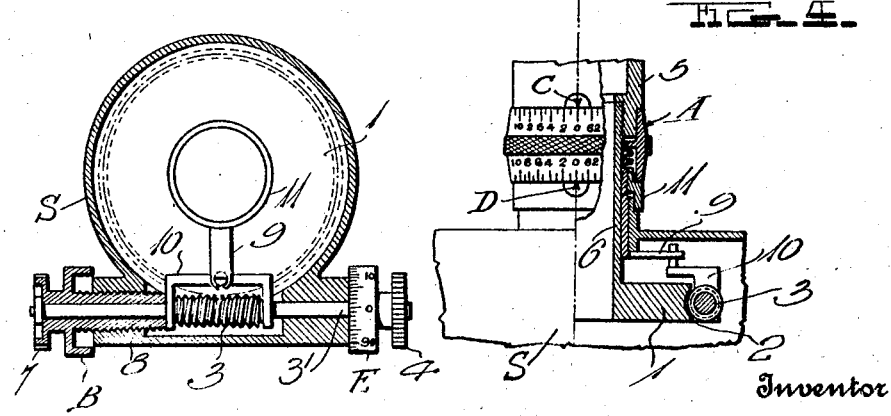
Inventor
ALDO CASTIGLIONI Patented Dec. 4, 1923.

1,476,591

UNITED STATES PATENT OFFICE.

ALDO CASTIGLIONI, OF ROME, ITALY.

DIFFERENTIAL GEAR FOR GONIOMETRIC APPARATUS.

Application filed May 10, 1919. Serial No. 296,136.

*To all whom it may concern:*

Be it known that I, ALDO CASTIGLIONI, engineer, subject of the King of Italy, and residing at Rome, Italy (whose post-office address is Via Velletri 21, Rome), have invented certain new and useful Improvements in Differential Gears for Goniometric Apparatus, of which the following is a specification.

The present invention relates to goniometric apparatus and particularly such apparatus when applied to panoramic telescopes or similar sighting apparatus.

The object of the invention is to provide a means for adjusting the angle measuring apparatus an amount equal to the algebraic sum of two angles, for instance in gun sighting apparatus, for the basic angle and the angle of correction, the amount of each of these angles being indicated at any stage of the adjustment.

Another object of the invention is the provision of means for adjusting the angle measuring apparatus an amount equal to the algebraic sum of the two angles without necessitating any computation with respect to the amounts of the angles.

I accomplish these, and other objects which will be apparent as the description proceeds, by apparatus such as is illustrated in the accompanying drawings, in which:

Fig. 1 shows a diagrammatic view of the device after adjustment for the first angle;

Fig. 2 shows a similar view of the device after the adjustment for a second angle;

Fig. 3 is a horizontal section through a panoramic telescope having the invention embodied therein; and Fig. 4 is a view, partly in vertical section of the apparatus illustrated in Fig. 3.

Referring to the diagrammatic showings of Figs. 1 and 2, A represents an adjustable scale ring on which is indicated a double scale, with which cooperate two pointers C and D, the former mounted on a fixed part of the apparatus and the latter on the movable part. This scale is graduated to read in units of angular measurement. The scale ring A is manually operable to indicate the units of angular measurement as transmitted by the observer to the operator; as shown in Fig. 1, the amount indicated is 4 units or an angular adjustment of 400 to the right of the 0—0 datum line. The element provided with the scale E, which is marked with the fractional angular units, is operable to adjust the indicator C and also the movable part of the apparatus. In Fig. 1, the scale E shows a reading of 70 fractional units of adjustment to the right of the angular adjustment of 400.

To make a second adjustment of the device, for example for the angle of correction, the scale ring A is again operated until it indicates relatively to the pointer C the angular units of the first adjustment, in the example shown the adjustment is 4 units. The scale B is then operated until the fractional units of the second adjustment are indicated thereon; the operation of the element carrying the scale B provides the second adjustment for the movable part of the apparatus which carries the pointer D. In the position of the apparatus shown in Fig. 2, the amount of this second adjustment is 580 which is 180 fractional units to the left of the first adjustment of 400. A reading of the two adjustments may thus be made at any stage of the operation by reading the position of the pointer C and the scale E and the position of the pointer D and the scale B. It is apparent that the movable part of the apparatus has been moved an amount equal to the algebraic sum of the two angles the amount of this adjustment in the example shown being 110 fractional units. It is thus apparent that the angle measuring apparatus has been adjusted an amount equal to the algebraic sum of the two angles without necessitating any computations. It is obvious that the diagrams in Figs. 1 and 2 are merely illustrative and that the member on which the scale E is mounted might be arranged to adjust the apparatus to the left and the member carrying the scale B to adjust it to the right without affecting the principles involved in the operation of the device as a whole.

An embodiment of this device in a panoramic telescope is illustrated in Figs. 3 and 4, in which the movable scale ring A is provided with a double scale with which the pointer C, mounted on the fixed part of the apparatus, and the pointer D mounted on the movable part of the apparatus, cooperate. Both the movable and the fixed part of the apparatus are supported on a suitable base S. The movable part of the apparatus comprises the sight support 1, which is provided with gear teeth 2, which are engaged by the worm screw 3 so that the movement of the latter in either a rotational or axial direction will rotate the support 1, which carries the optical elements of the apparatus.

The worm screw 3 is keyed to the shaft 3' so as to be rotatable therewith or to slide thereon without rotation;—the worm shaft 3', and consequently the worm screw 3, is rotated on its axis by means of the head 4, which is provided with the scale E; rotation of the worm screw 3 rotates the support 1, which is geared thereto, and also the sleeve 5 which carries the pointer C. The sleeve 5 is here shown as screwed to an upwardly extending tubular member 6 carried by the support 1.

The worm screw 3 is translated in an axial direction without rotation by the operation of the head 7 of the hollow screw 8, on which is also carried the scale B. The axial movement of the screw 3 operates the lever 9, through the medium of the U-shaped sleeve member 10 which is slidably mounted on the worm shaft 3'. The lever 9 carries with it the ring 11, bearing the pointer D, whereby the fractional units of the angular adjustment are indicated.

The function of the device will be readily understood from the foregoing description, and it will be only necessary to recapitulate the several operations involved. The instrument being set up with all of its scale members in their initial or zero position with the line of sight on the datum line 0—0, it is desired that it be adjusted to a position of 470 degrees to the left of this datum line with a correction of 580 degrees to the right of this first position.

The scale ring A is first moved to indicate in connection with the indicator the 4 angular units or 400 degrees of the first adjustment; the worm screw 3 is then operated until the scale E indicates the amount of the fractional units of adjustment which, in the example shown is 70. This rotation of the worm screw 3 moves the sight support 1 the desired amount, and the scale A, which is frictionally mounted on the sight support, now reads in connection with the pointer C 470 degrees.

To make the second adjustment, of 580 degrees to the right of the first position of 470 degrees, the sight support is rotated by means of the head 7 on the hollow screw 8, which translates the worm screw in an axial direction, the screw sliding on the shaft 3' without rotating. The rotation of the head 7 rotates the ring 11, carrying the indicator D. Within the meaning of the appended claims, the ring D may be considered as mounted upon the base S since it does not move with the sight support but is operated independently by the lever and yoke members.

It is obvious that certain minor changes might be made in the apparatus shown without departing from the spirit of my invention, for instance, the ring A might be provided with a trip device so that it would move only whole units at a time.

What I claim as new and desire to secure by Letters Patent is:

1. In a device of the class described, a base, a sight support rotatably mounted thereon, a ring adjustably mounted on said support, said ring being provided with a double scale, having a common starting point for two adjustments, said base and sight support being provided with pointers cooperating with said scale, and means on said base for rotating said sight support relative to said base.

2. In a device of the class described, a base, a sight support rotatably mounted thereon, a ring adjustably mounted on said support, said ring being provided with a double scale, having a common starting point for two adjustments, said base and said sight support being provided with pointers cooperating with said scale, and means on said base for rotating said sight support relative to said base, said means being provided with scales the units of which are fractions of the units on the first named scale.

3. In a device of the class described, a base, a sight support rotatably mounted thereon, a ring adjustably mounted on said support, said ring being provided with a double scale, having a common starting point, said base and sight support being provided with pointers cooperating with said scale, and a plurality of devices on said base for independently rotating said sight support.

4. In a device of the class described, a base, a sight support rotatably mounted thereon, a ring adjustably mounted on said support, said ring being provided with a double scale, having a common starting point, said base and sight support being provided with pointers cooperating with said scale, a plurality of devices on said base for independently rotating said sight support, said devices being provided with scales the units of which are fractions of the units of the first named scale.

5. In a device of the class described, a base, a sight support rotatably mounted thereon, a scale ring rotatably mounted on said sight support and provided with scales on the opposite edges thereof, said scales having a common starting point for two adjustments, a second ring mounted on said base, said support and said second named ring being provided with pointers to coöperate with said scales, means on said base for rotating said sight support and said second named ring together, and means for rotating said sight support independently of said second named ring.

In testimony whereof I have hereunto signed my name in the presence of two witnesses.

ING. ALDO CASTIGLIONI.

Witnesses:
EMILIO GALLIMBERTI,
LUIGI CORRADINO.